United States Patent

[11] 3,589,646

[72] Inventor Kuninor Mori
Fujisawa Danchi 22—402, No. 13, 1-chome
Fujigaoka; Fujisawa Danchi, Fujisawa-shi
Kanagawa-Ken, Japan
[21] Appl. No. 786,605
[22] Filed Dec. 24, 1968
[45] Patented June 29, 1971

[54] VERTICAL TAKE-OFF AND LANDING AIRPLANE
15 Claims, 20 Drawing Figs.
[52] U.S. Cl. .................................................. 244/7,
244/114, 244/55
[51] Int. Cl. .................................................. B64c 27/22
[50] Field of Search .................................. 244/7, 2,
51, 52, 56, 114, 55

[56] References Cited
FOREIGN PATENTS
607,924 9/1948 Great Britain ................. 244/7

Primary Examiner—Milton Buchler
Assistant Examiner—Carl A. Rutledge
Attorney—Berman, Davidson and Berman ABSTRACT: A vertical takeoff and landing airplane including a master body provided with a propelling mechanism, and a subordinate body suspended from the master body solely by a universal joint, whereby variation of the direction of the output of said propelling mechanism will cause change from vertical to horizontal flight. The propelling mechanism may include a varying number of groups, each formed of several engines, arranged in varying configurations. In certain embodiments a winged fuselage is provided between upper and lower groups of engines and a leg including a tail plane at the rear is extended from the master body, and the centroid of the master body and the universal coupling to the subordinate body are located in the same point. In other embodiments the point of application of the propulsion forces of the master body are displaced axially of the centroid of said body and the universal joint supporting the subordinate body is shiftable along said axis to vary the spacing thereof from the point of application of the propelling force.

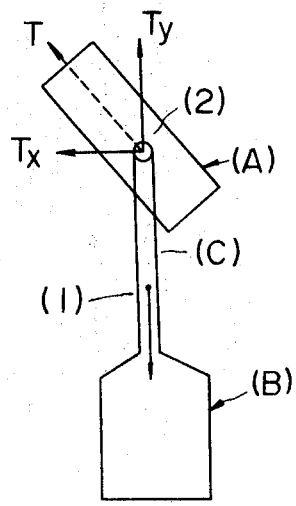
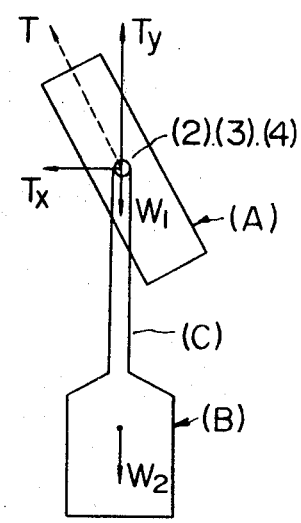
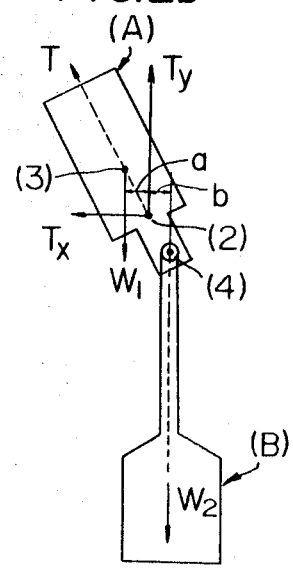
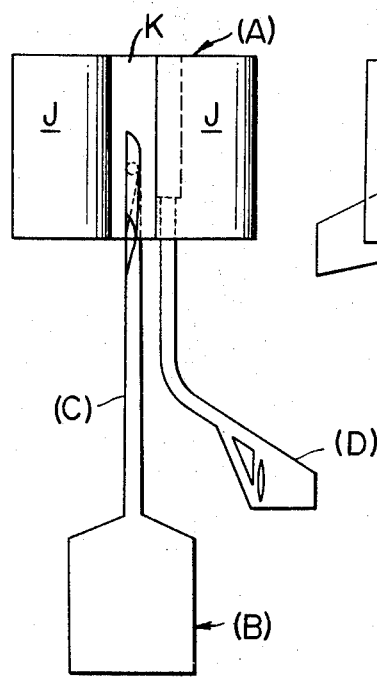
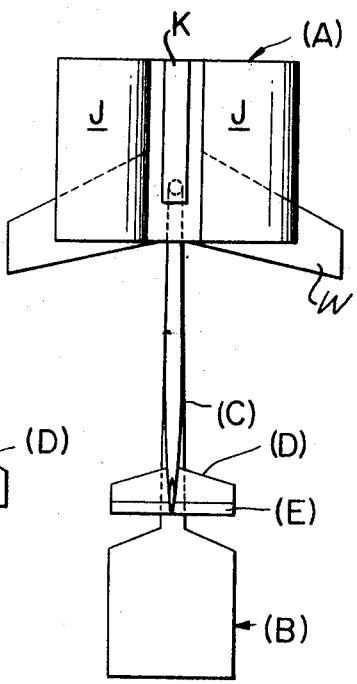
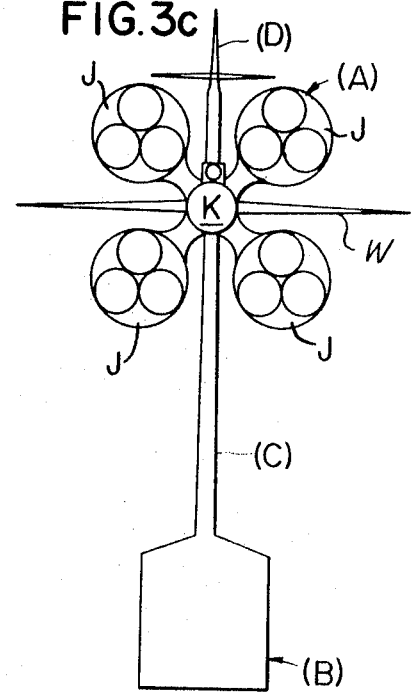

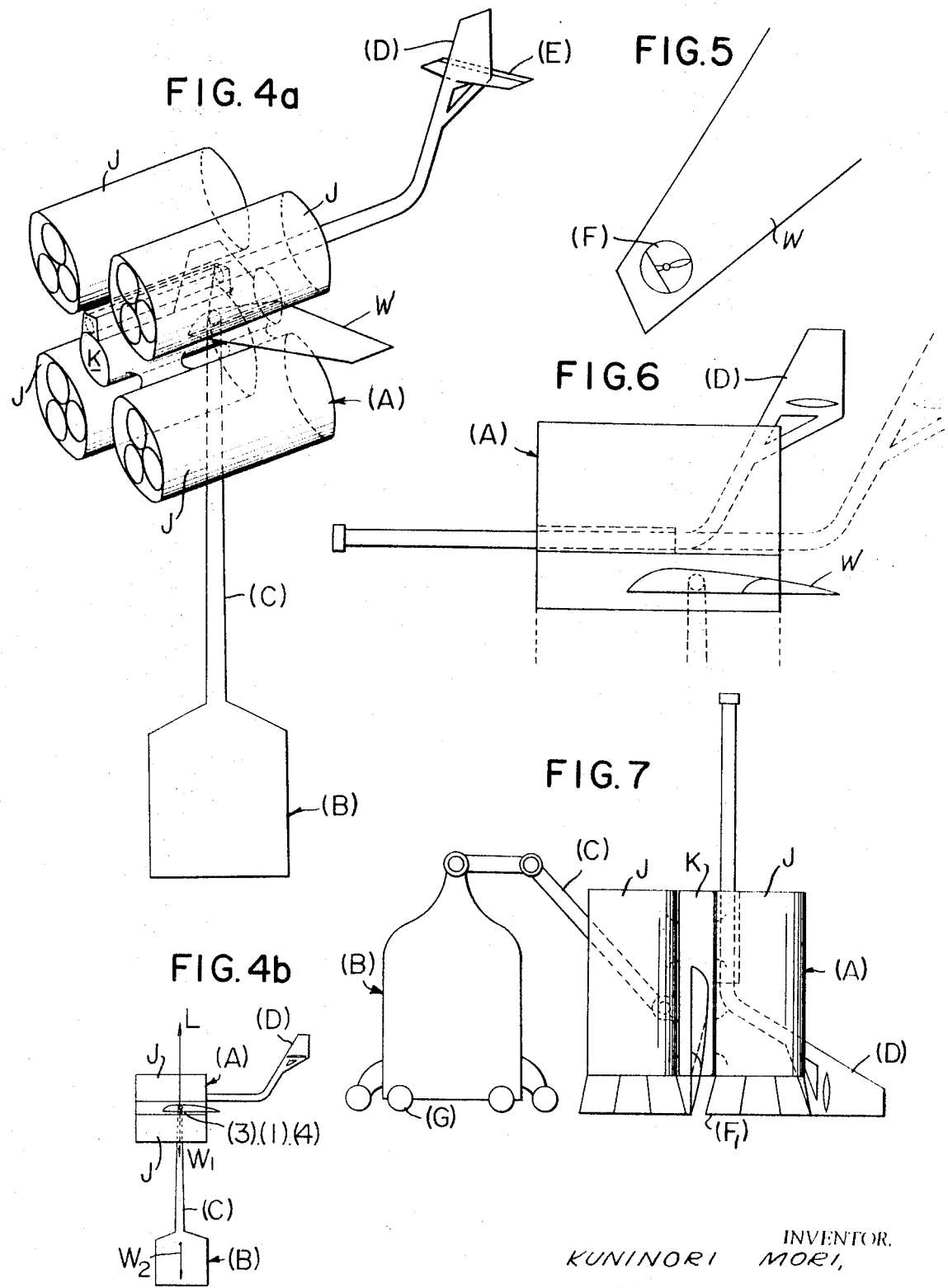

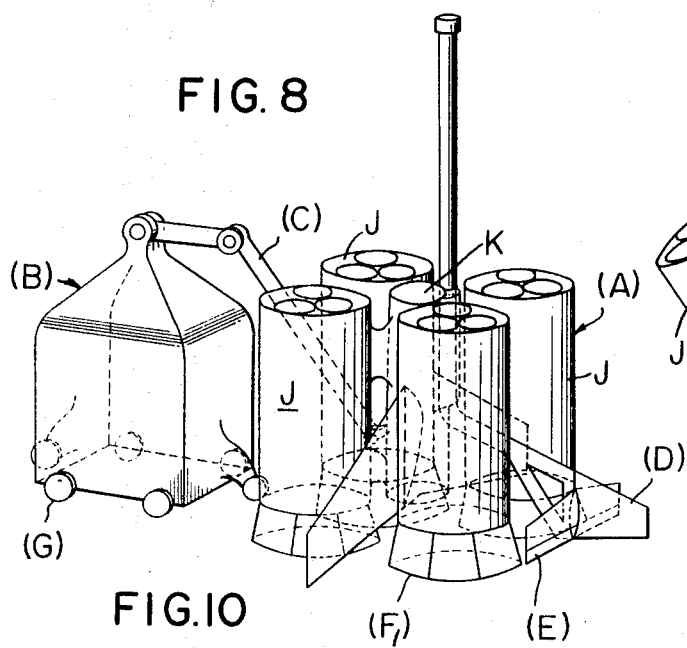
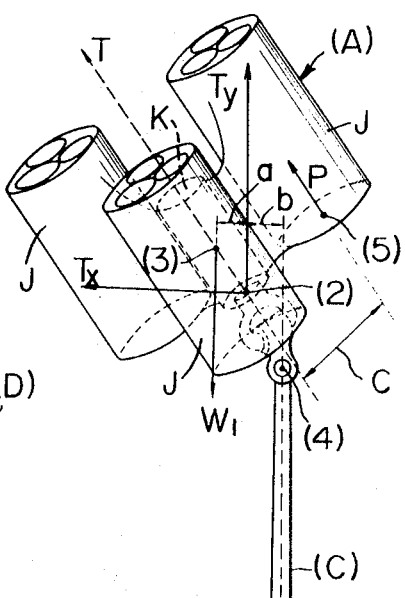
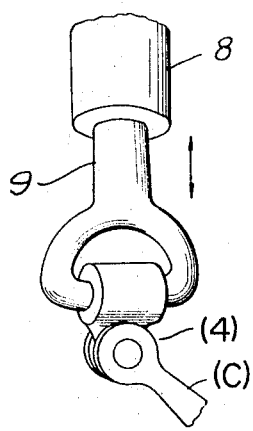
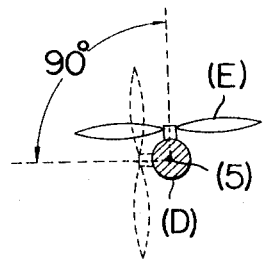
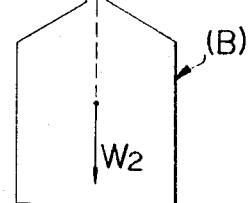

PATENTED JUN29 1971 3,589,646

INVENTOR.
KUNINORI MORI,
BY
Berman, Davidson & Berman
ATTORNEYS.

VERTICAL TAKE-OFF AND LANDING AIRPLANE

This invention relates to aircraft, and more particularly to winged and unwinged airplanes capable of vertical takeoff and landing. The improved plane comprises a master body and a subordinate body, the latter being hung from the former solely by means of a universal joint. The master body is provided with a propulsion mechanism whose change of direction of output caused by tilting the master body with respect to the subordinate body with atmospheric reaction (obtained when the master body exercises force against the atmosphere) will cause the plane to change from vertical flight to horizontal flight and vice versa.

It is a primary object of the invention to provide a vertical takeoff and landing airplane which may be winged, or unwinged, and which comprises a pair of bodies, one hung from the other by means of a universal joint solely, one of said bodies being provided with a propulsion mechanism whose change of direction of output caused by tilting said body with respect to the other body will cause the plane to change from vertical to horizontal flight.

It is another important object of the invention to provide an improved vertical takeoff and landing airplane, having the above-described characteristics, which evidences high stability while in vertical and horizontal flight.

Still another important object of the invention is to provide an improved vertical takeoff and landing airplane, having the above-described characteristics, which provides easy and smooth shifting from vertical to horizontal flight.

Yet another important object of the invention is to provide an improved vertical takeoff and landing airplane, having the above-described characteristics, which is free from abnormal and undesirable effects at times of increase and decrease in speed and change of direction.

Yet a further object of the invention is to provide an improved vertical takeoff and landing airplane, having the above-described characteristics, which is of simple construction, easy and economical to fabricate, and easy to fly.

Throughout this specification and claims various model planes are referred to by special terminology as follows:
  Model WJS—jet engines or groups installed with wings and are disposed in square configuration;
  Model JT—jet engines or groups are disposed in a triangle;
  Model JP—jet engines or groups are disposed in pairs.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 is a system diagram illustrating an embodiment of the invention wherein a subordinate body B having an elongated arm C is hung from a master body A;

FIG. 2a is a similar system diagram explaining the principle of easy rotation permitted to the master body A by applying the point of application of propelling power at the pivot connecting said bodies;

FIG. 2b is a similar diagram wherein the point of application of the propelling power is displaced somewhat from the pivot connecting the bodies and axially of the master body;

Figure 11:
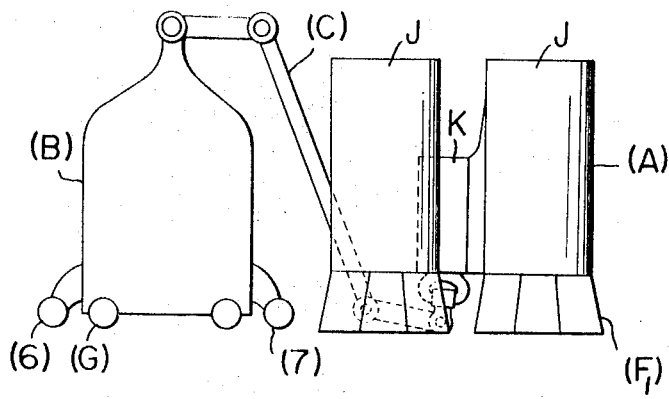
Figure 12:
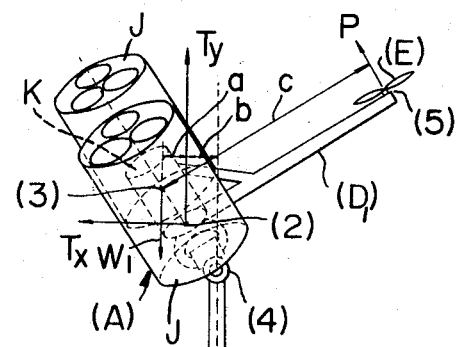
Figure 14:
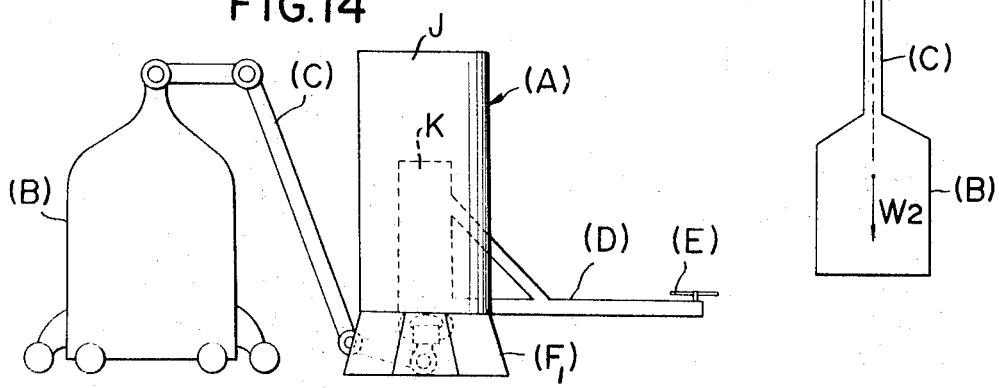
Figure 15:
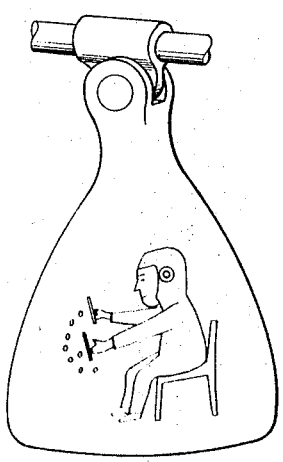
Figure 16:
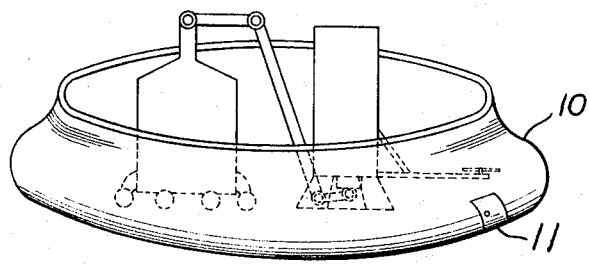

FIGS. 3a, 3b and 3c are diagrammatic views explaining the fundamental principle and structure of the invention as applied to a Model WJS airplane, FIG. 3a being a side elevation of said airplane in vertical flight; FIG. 3b being an elevational view of said airplane as in FIG. 3a, but as seen from the back thereof; and FIG. 3c being an elevational view of said airplane in horizontal flight as seen from the front thereof;

FIG. 4a is a diagrammatic perspective view of the same Model WJS airplane in horizontal flight;

FIG. 4b is a side elevation on a reduced scale of the same airplane in horizontal flight;

FIG. 5 is a fragmentary diagram showing a shiftable closure lid for a propeller well in the wing of the plane;

FIG. 6 is a fragmentary side elevation showing two positions of a shiftable tail plane on said airplane;

FIG. 7 is a side elevation showing the after-landing position of said airplane;

FIG. 8 is a diagrammatic perspective view corresponding to FIG. 7;

FIG. 9 is a diagrammatic, perspective view similar to FIG. 2b showing the basic structure of a Model JT airplane;

FIG. 10 is a fragmentary perspective diagram showing a universal coupling for the subordinate and master bodies;

FIG. 11 is a side elevation showing the after-landing position of the Model JT airplane;

FIG. 12 is a diagrammatic, perspective view similar to FIG. 9, but showing the fundamental structure of a Model JP airplane;

FIG. 13 is a fragmentary elevational view showing a 90° rotation of the direction of the tail propeller for change of positions of the JP airplane;

FIG. 14 is a side elevation showing the after-landing position of the JP airplane;

FIG. 15 is a diagrammatic perspective view of a cockpit for installation within the confines of the master body; and FIG. 16 is a diagrammatic perspective view showing the outline of a simplified airport.

This invention concerns winged and unwinged airplanes having the three fundamental characteristics necessary for vertical takeoff and landing airplanes, e.g., (1) high stability in a vertical position, (2) an easy and smooth shifting from vertical to horizontal flight, and (3) freedom from abnormal, undesirable effects at times of increase and decrease in speed and change of direction. As illustrated in FIG. 1, the basic principle of the inventive airplane is embodied in the fact that a plummet-shaped subordinate body B (conceived for added stability of the plane) is hung from a master body A equipped with a propulsion mechanism, by a smoothly connecting universal joint, no other mechanical connection or interference being existent between the master and subordinate bodies. The reason why such an airplane evidences said three characteristics are as follows.

For characteristic (1), the centroid 1 of the whole airplane is positioned lower than the application point 2 of propulsion by hanging the subordinate body B from the master body A by means of an elongated arm C so that the stability of the airplane is augmented. The longer the arm C, the lower the centroid position.

Regarding the above characteristic (2), a shift to horizontal flying can be achieved by tilting the direction of propulsion force from the vertical to the horizontal direction, effected by tilting body A which houses, or supports, the propulsion engines J. In order to tilt body A easily, a condition must be produced wherein body A is easily moved (rotated about the hanging point 4 as a pivot) by a weak external force for which there are two methods: (1) As shown in FIG. 2a, the centroid 3 of body A, the point 4 from which body B is hung, and the application point 2 of the propelling power T (shown as horizontal thrust component $T_x$ and vertical thrust component $T_y$) are focused, in one point; (2) if centroid 3 and application point 2 are not brought together in one common point, the hanging point 4 can be chosen properly so that an equation $aW_1=bW_2$ is fulfilled as shown in FIG. 2b, $W_1$ being the weight of body A, $W_2$ the weight of body B, and $a$ and $b$ are respectively the horizontal distances between the application point 2 and the gravity forces $W_1$ and $W_2$. The best way of moving, or tilting, body A is to use reaction with the atmosphere the better to obtain the characteristic of smooth shifting. The exercise of force from the subordinate body B will cause undesirable effects to B as B in that case is subject to the reaction thereof.

Concerning lastly the characteristics (3), since the only connection between body A and the subjective body B (intended for passengers and freight) is by universal joint 4 permitting bodies A and B to rotate relative to one another in arbitrary directions, the inertia force produced in body B by every change in the motion of body A operates vertical upon the bottom floor of body B. Therefore, passengers and freight inside body B are free from extraneous movements, or quaking, in the horizontal direction.

To give a detailed and concrete explanation of actual airplanes equipped with the above inventive mechanisms, reference is made to the following wherein several jet engines combined into one group are intended as the airplane propulsion means, and usually several groups arranged in varying configurations with, or without wings, are employed.

MODEL WJS AIRPLANE

As illustrated in FIGS. 3a—c, and 4a and b, the master body A comprises a fuselage K surrounded by four groups of jet engines, or other suitable propulsion devices secured thereto, in the corners of a square, a horizontal main wing W fixed to the fuselage K between the upper and lower engines, and a tail D secured to the fuselage K contractable, or shiftable, toward the front, of the fuselage K. The application point of lift of the main wing and the centroid of the master body A are disposed in one common point, and a subordinate body B is hung therefrom. The tail is provided with steering means as, for example aileron E, FIGS. 3b and 4a. During high-speed elevation when the steering means E is angled downwardly with respect to the top of the tail, the master body A will tilt to effect horizontal flight after which the aileron may be straightened from its downward angle. Steering changes in horizontal directions during horizontal flight are made by shifting weight (not shown) along the main wing in the same way as for ordinary airplanes. Alternatively, one of a number of auxiliary propulsion devices, which may be provided on the propulsion devices of the right and left sides, may be operated to cause imbalance of propelling power on opposite sides. Change of direction from horizontal to vertical flight is accomplished by turning the steering means E upwardly during high-speed elevation (during low-speed it happens hastily) so that the master body will move to an elevated, or upwardly nosed position. Stalling of this airplane has little effect on its stability for when the lift becomes smaller than the weight, or gravity, of the airplane in horizontal flight, the airplane starts to glide stably because the centroid is positioned lower than the application point of lift of the main wing. When the vertical vector of propelling power becomes smaller than the weight, or gravity, of the airplane in vertical flight, as long as the vertical vector element of the propelling power is directed upwardly, the airplane starts to descend stably because the centroid is lower than the application point of the propelling power.

Means for turning the described WJS airplane in horizontal directions while in vertical position for landing at an exact target point is illustrated in FIG. 5. Each wing tip of a master body A is provided with a propulsion device, or propeller F, disposed in a well and directed at right angle to the propulsion means of the aforementioned groups. The well of each device F has a slidable cover, or lid, which may be moved from open to closed positions. Thus, with the airplane disposed for descent as in FIG. 3b, the wing propellers F may be operated simultaneously to cause forward movement of the airplane during descent toward the target point. Sideward, or turning, movements are made by operating one of the propellers F. The lids covering the propellers F are closed when the plane is in horizontal flight.

While landing the plane, the tail D is shifted toward the body A from the broken line position to the solid line position of FIG. 6, and the connecting rod C of the subordinate body B is bent about an intermediate pivot point (unnumbered) so that the master body A can descend along the subordinate body B and the airplane makes a landing in the position illustrated in FIGS. 7 and 8. The stability of the master body in the interval between the landing of the subordinate body B and the landing of the master body A is low since the centroid of the master body is higher than the application point of the propelling power. Therefore, sufficient care should be taken for uniformity in propelling powers of the four propulsion groups to make landing so as to prevent the master body from tilting. When, however, the four groups do not provide uniform propelling power, a propeller device having small output is fitted to each group, thereby enabling minute regulation of propelling power. Similarly, in takeoff, sufficient care should be taken to maintain the erect position of the master body until the subordinate body leaves the ground.

MODEL JT AIRPLANE

This model features the arrangement of three groups of jet engines J (each group consisting of several jet engines) on the three apexes of a regular triangle as shown at A in FIG. 9 and secured to a central fuselage K, the wing and tail being omitted. Tilting the master body A to attain a horizontal flying position (position change) is accomplished by increasing the output of one of the three groups of propellers J. Though the propelling power of each of the three groups can be regulated directly, it is better to regulate the propelling power of an auxiliary propulsion device, not shown, added to each group, since due attention should be given to the desirability of uniformity of main propelling power. By increasing the power output of one group from among the three groups, the airplane can move sideways, or turn, irrespective of whether the airplane is flying at high or low speed. It is highly important to note the advantage of this plane wherein the selective increase of output of one group of engines, either directly, or by addition of an auxiliary propulsion device, simultaneously performs the double function of changing the position, or tilt, of the master body and changing the direction of flight.

In the JT airplane preferably the same mechanism, featuring the equation $aW_1=bW_2$ as shown and described above for FIG. 2b, is employed. But since the $aW_1=bW_2$ mechanism gives the master body an undue mobility and thus lowers its stability, the hanging point 4 of the subordinate body B should be chosen so that the relation $aW_1<bW_2$ is fulfilled; and when an added amount of propelling power P exercised at point 5, FIG. 9, is obtained by causing one of the three groups of propellers (the uppermost group when the plane is tilted) to give greater output than the other two groups, said added power output P and the hanging point 4 should be adjusted so that the equation $aW_1+CP=bW_2$ is fulfilled, where C is the distance between hanging point 4 and force P, thereby to increase the stability. Though the added power P may be obtained by operating one of the three groups of propulsion devices, it is better to fixedly mount an auxiliary propulsion device, not shown, for exclusively exercising continuous output increase to a particular one of the three groups since the auxiliary device is required for continuous output increase. By adding the auxiliary propulsion device to the highest group of propellers, tilting of the master body will then be accomplished by varying the power output of the auxiliary propulsion device.

For adjusting the hanging point 4, the distance b should be regulated by pistonlike movement as shown by the arrows in FIG. 10, the universal joint coupling including a cylinder 8 and piston 9.

In the final moments of landing, the JT airplane will have its arm C, as shown in FIG. 11, bent, in the manner described above in connection with FIGS. 7 and 8, a pivotal coupling being provided at each end, and at an intermediate point. The master body A, upon landing, is supported by legs $F_1$, and the subordinate body B is supported by wheels G. The wheels 6 and 7 in FIG. 11 are intended to keep body B from tilting with the horizontal vector of the force operated from arm C to body B when the arm is bent in a landing operation. In the time interval from the landing of the subordinate body B to the landing of the master body A, sufficient care should be taken for uniformity of propelling power of the three groups of propulsion devices, as described above, in the case of the Model WJS airplane.

MODEL JP AIRPLANE

In this model, as shown in FIG. 12, two groups of jet engines J are used, each group being a combination of several jet engines. These groups are mounted at the lateral flanks of the master body on a fuselage K, and an arm D is extended from the application point 2 of propelling power of said two groups to a rear tip 5 at which a propeller E is mounted to revolve about an axis vertical to the arm D and to exercise auxiliary power parallel to the direction of the propelling power of master body A. The reaction with the atmosphere by the propelling power of the auxiliary propeller at E enables the direction of the master body to be altered to horizontal flying. The hanging point 4 is equipped with the coupling mechanism illustrated in FIG. 10 so as to permit shifting adjustment. Now, in the case of $aW_1=bW_2$, the master body A is too mobile and so loses in stability; therefore, the point 4 is chosen in such a way that the relation $aW_1<bW_2$ is fulfilled. And, thereafter, stability is obtained by so regulating the position of the point 4 and the magnitude of force P obtained by working as the propeller E continuously, the equation $aW_1+CP=bW_2$ is fulfilled, as described in connection with the JT airplane. Sideward changes of direction while in high-speed flying is made by increasing the output of the engines of one group at one side of master body A. Auxiliary engines may be added to the groups to be used exclusively for change of direction, and these may be used in addition to the regular propelling engines to add to the output during straight-line flight. Change of direction during low-speed flying, when the position of the airplane is nearly vertical, is made by utilizing the horizontal vector of the propelling force of propeller E obtained by pivoting propeller E about the arm D in some angle between 0° and 90°, as illustrated in FIG. 13.

In the final moments of landing, the airplane has the arm C, supporting the subordinate body, bent as in FIG. 14, in the same way as in the case of the Model JT airplane in FIG. 11. In the brief time interval from the landing of the subordinate body B to the landing of the master body A, the centroid of the master body is slightly shifted in the direction of the arm D due to the weight of said arm; therefore, the master body loses in stability and is tilted toward the arm. In order to correct this, the propeller E at the rear of the arm D is operated with speed adjusted so as to prevent the master body from tilting. Sufficient care should be taken to preserve uniformity of propelling power of the two groups of jet engines, as mentioned above with respect to the two kinds of airplanes previously described.

The cockpit of all of the above-described airplanes is provided inside the subordinate body B, and conventional means (not shown) is provided for remote control of all propulsion engines and mechanical elements of the aircraft, such as ailerons, tail steering planes, and the parts of the support arm C. These conventional means may include the usual cables, links, levers and jacks, whether of mechanical or fluid pressure types. When such control is impossible, a cockpit may be hung inside the fuselage of the master body by the use of a universal joint similar to that employed for hanging the subordinate body, as as to be stable irrespective of the jolting of the master body, see FIG. 15.

During takeoff and landing, considerable winds will be blown against the ground by the gas jets of the propelling engines, causing dust to rise and scatter all about. Employed to prevent this, is a simplified tray-shaped airport 10, in other words, the tray for catching wind, whose structure is illustrated in FIG. 16. The size of the tray is decided according to the size of the airplane using the tray. The tray 10 is shaped as a large bowl having the sides curved inwardly to direct and to ascend the wind blown against the tray back toward the center so as not to scatter. The upper edges of the tray are directed vertically to ascend the wind vertically. By catching this ascending wind for the airplane the takeoff and landing of the airplane is done easily and smoothly. A door, or gateway 11, is provided in the sidewall of the tray for entry and exit of passengers. With this type of airport the efficiency of the takeoff and landing is improved.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What I claim is:

1. A vertical takeoff and landing airplane comprising a master body including a fuselage having a propelling mechanism secured thereto, a subordinate body spaced substantially below said master body and including space for freight and passengers, an arm secured to and extending upwardly from said subordinate body, a universal joint forming the sole mechanical connection between said arm and said master body, whereby variations in the direction of output of said propelling mechanism on tilting said master body with respect to said subordinate body will through reaction with the atmosphere change the direction of flight of said airplane from vertical to horizontal.

2. A vertical takeoff and landing airplane according to claim 1, wherein said universal joint is located at the centroid of said master body.

3. A vertical takeoff and landing airplane according to claim 1, wherein said master body includes a wing, the application point of the lift of said wing, the centroid of the master body, and said universal joint being located at the same point.

4. A vertical takeoff and landing airplane according to claim 3, wherein said propelling mechanism comprises four groups of propelling engines, each group comprising several engines and being placed at the corner of a square, said wing being positioned between two adjacent of said groups and the remaining two groups.

5. A vertical takeoff and landing airplane according to claim 4, wherein the tips of said wing are apertured to receive propulsion devices directed at right angles to the propelling engines of said groups, said apertures being provided with slidable lids capable of opening and closing the apertures, whereby, during vertical descent of the airplane, power may be applied by said propulsion devices of the wing to maneuver the airplane horizontally toward a target landing point.

6. A vertical takeoff and landing airplane according to claim 1, wherein said master body is provided with a wing and a rearwardly extending leg terminating in a tail structure which includes steering means for vertical changes in direction.

7. A vertical takeoff and landing airplane according to claim 6, wherein said rearwardly extending leg is provided with means for shifting the same forwardly and rearwardly with respect to said master body and wing.

8. A vertical takeoff and landing airplane, according to claim 1, whereby said arm is rodlike and is attached to the subordinate body at its lower end by a pivotal joint, and a second pivotal joint is provided in an intermediate portion of said arm to permit bending of the arm at said intermediate portion during takeoff and landing of the airplane.

9. A vertical takeoff and landing airplane according to claim 8, wherein said subordinate body is provided with a plurality of wheels secured to the bottom thereof to support the subordinate body while on land.

10. A vertical takeoff and landing airplane according to claim 1, wherein a cockpit is attached to the master body by means of a universal joint.

11. A vertical takeoff and landing airplane according to claim 1, wherein said propelling mechanism comprises three groups of propelling engines, each of said groups comprising several engines and being disposed at the apex of a regular triangle, positional change and directional change of the propelling force of the master body being effected by causing the output of a particular one of the three groups of propelling engines to be greater than the output of each of the remaining two groups.

12. A vertical takeoff and landing airplane according to claim 11, wherein said fuselage is positioned in said main body between said three groups of propelling engines, said subordinate body being suspended from said universal joint at a point located on the rear portion of said fuselage, means for shifting said universal joint axially of the master body along said fuselage, whereby to change the distance of the universal joint from the point of application of the combined propelling powers of said propelling engines, and the point of application of the combined propelling powers of said propelling engines is positioned between the centroid of the master body and the universal joint which suspends the subordinate body.

13. A vertical takeoff and landing airplane according to claim 1, in combination with a tray-shaped airport, said airport comprising a bowllike member having a bottom and a continuous sidewall, said sidewall being curved inwardly to direct and ascend wind gusts back toward the airplane during takeoff and landing, whereby to prevent scattering of dust, dirt, and the like and to improve the efficiency of the takeoff and landing.

14. A vertical takeoff and landing airplane according to claim 1, wherein said propelling mechanism comprises two groups of propelling engines, each of said groups including several engines, said groups being disposed laterally of each other on said master body, said fuselage being disposed between said groups, said subordinate body being suspended from the rear portion of said fuselage by said universal joint, the point of application of the combined propelling powers of said groups being positioned between the centroid of the master body and said universal joint suspending the subordinate body, means for shifting said universal joint axially of the master body along said fuselage, whereby to change the distance of the universal joint from the point of application of the combined propelling powers of said groups, a rearwardly extending arm being fixed to said fuselage at said point of application, and a propeller fitted at the rear end of said arm, said propeller exerting a force parallel to the force of said propelling engines.

15. A vertical takeoff and landing airplane according to claim 14, wherein said propeller is mounted on a swivel to rotate about said arm and change the direction of force of said propeller.